United States Patent [19]

Albisser et al.

[11] Patent Number: 5,799,570

[45] Date of Patent: Sep. 1, 1998

[54] APPARATUS FOR THE EXTRACTION OF OIL FROM FRIED FOOD PRODUCTS

[75] Inventors: Priscilla Albisser, Mutschellen; Guido Bohler, Zurich; Alfred Meister, Eglisau, all of Switzerland; Manfred Wockel, Bad Sackingen, Germany

[73] Assignee: Zweifel Pomy Chips AG, Switzerland

[21] Appl. No.: 805,563

[22] Filed: Feb. 25, 1997

[30] Foreign Application Priority Data

Feb. 26, 1996 [DE] Germany ............... 196 07 140.2

[51] Int. Cl.$^6$ ................ A23B 5/00; A23N 1/00; A47J 43/14

[52] U.S. Cl. ................ 99/495; 99/516; 99/484; 422/292; 422/267; 422/269

[58] Field of Search ............... 99/495, 494, 484, 99/516; 426/417, 425, 438; 210/800, 802, 803, 804, 805, 513, 523, DIG. 8, 633, 708, 737, 738, 774; 422/267, 268, 292, 269, 261

[56] References Cited

U.S. PATENT DOCUMENTS

| 5,408,924 | 4/1995 | Arendt et al. ............ 99/495 X |
| 5,487,907 | 1/1996 | Drown et al. ............ 99/495 X |
| 5,525,746 | 6/1996 | Franke ................ 426/417 X |

*Primary Examiner*—Reginald L. Alexander
*Attorney, Agent, or Firm*—Gifford, Krass, Groh, Sprinkle, Patmore, Anderson & Citkowski, P.C.

[57] ABSTRACT

Described is an apparatus for the extraction of oil from fried food products, especially thin food products, such as snack products, in which the food product is not damaged and which enables an especially homogeneous distribution of the seasonings.

11 Claims, 2 Drawing Sheets

1

APPARATUS FOR THE EXTRACTION OF OIL FROM FRIED FOOD PRODUCTS

BACKGROUND OF THE INVENTION

The subject matter of this invention concerns an apparatus for the extraction of oil from fried food products, especially from so-called snack products, such as potato chips. In particular, the subject matter of this invention concerns an apparatus in which organic solvents are used in a manner to ensure that the determining production parameters and a uniformly high product quality are maintained.

It is well known that the extraction of oil from fried food products can be carried out by bringing these products in a container once or repeatedly, into contact with an appropriate organic solvent, as a result of which the oil contained in the products dissolves completely or partially and is removed in dissolved form from the products, for example, by filtration. This type of process has been described, for example, in the German Patent No. 3,215,315. Extraction processes as well as extraction apparatuses are used in other areas of food processing, especially to extract oil from oilseeds and to extract sugar. An overview of the apparatus used in such processes has been described, e.g., in M. Loncin, Grundlagen der Verfahrenstechnik in der Lebensmittelindustrie [Principles of Process Engineering in the Food Industry], in Perry's Chemical Engineer's Handbook, and in Ullmanns Enzyklopadie der technischen Chemie [Ullmann's Encyclopedia of Industrial Chemistry].

In these area of food processing, the focus is on the quantitative separation of the components oil or sugar. The raffinate, i.e., the extracted cell substance, is utilized as animal fodder, which means that there are not requirements with respect to structure, texture, and color. To obtain the highest possible yield, the starting material is instead comminuted prior to extraction to form flakes, chips, and fiber pulp.

SUMMARY OF THE INVENTION

Thus, the problem to be solved by this invention was to design an apparatus for the extraction of oil from thin, fried food products, which apparatus is substantially closed and which operates continuously or semicontinuously, which can be operated so as to be explosion-proof, and in which the product retains the structure that was imparted to it during frying and in which the food product is subjected to the least mechanical stress possible.

This problem was solved by an apparatus according to the invention Preferred embodiments of this invention are described in the subordinate claims.

Embodiments of apparatuses as claimed in this invention are illustrated in the attached FIGS.

DETAILED DESCRIPTION OF THE PREFERRED EMBODIMENT

Figure 1:
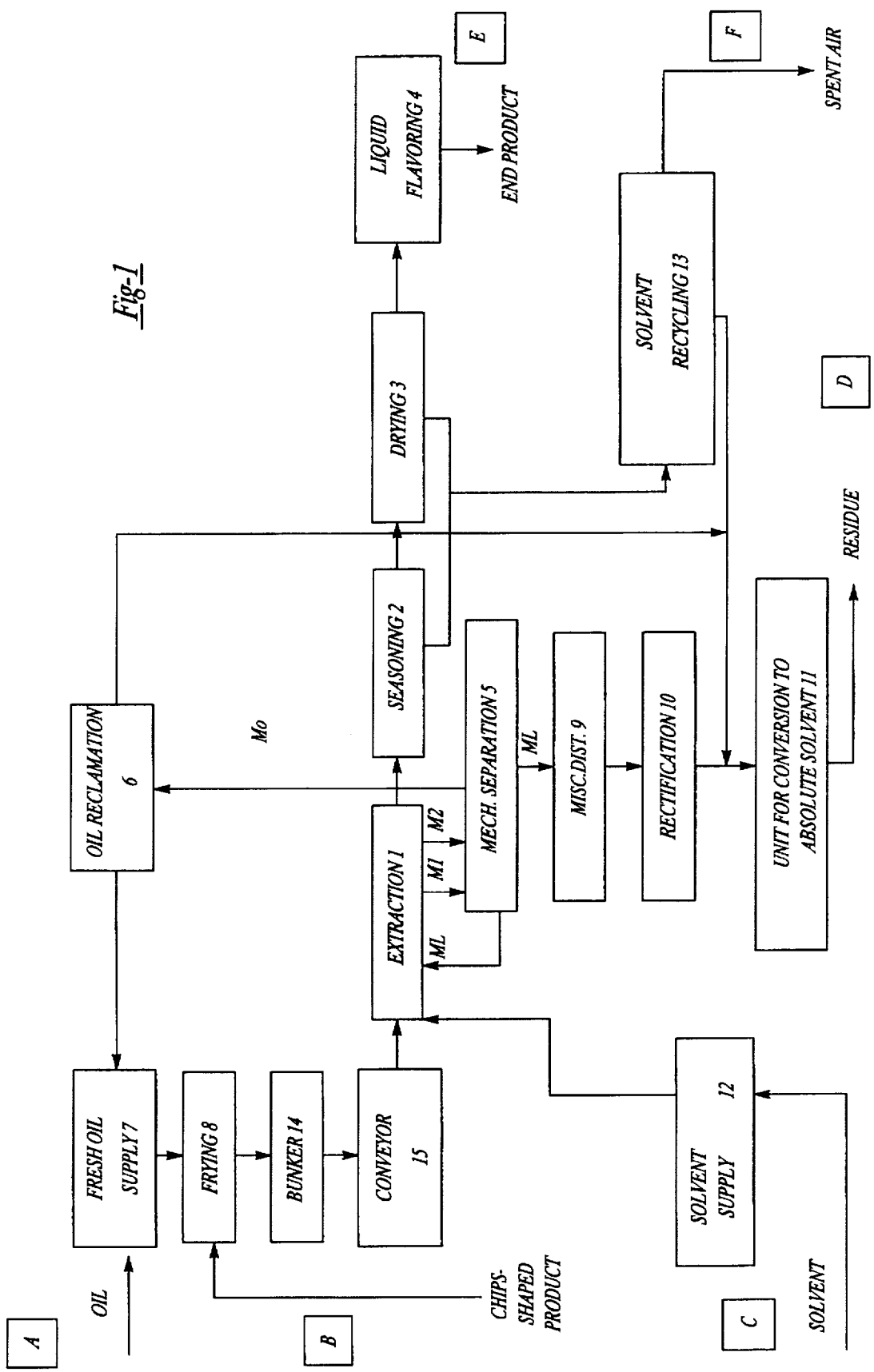
FIG. 1 gives an overview of the most important elements of an apparatus according to this invention.
Figure 2:
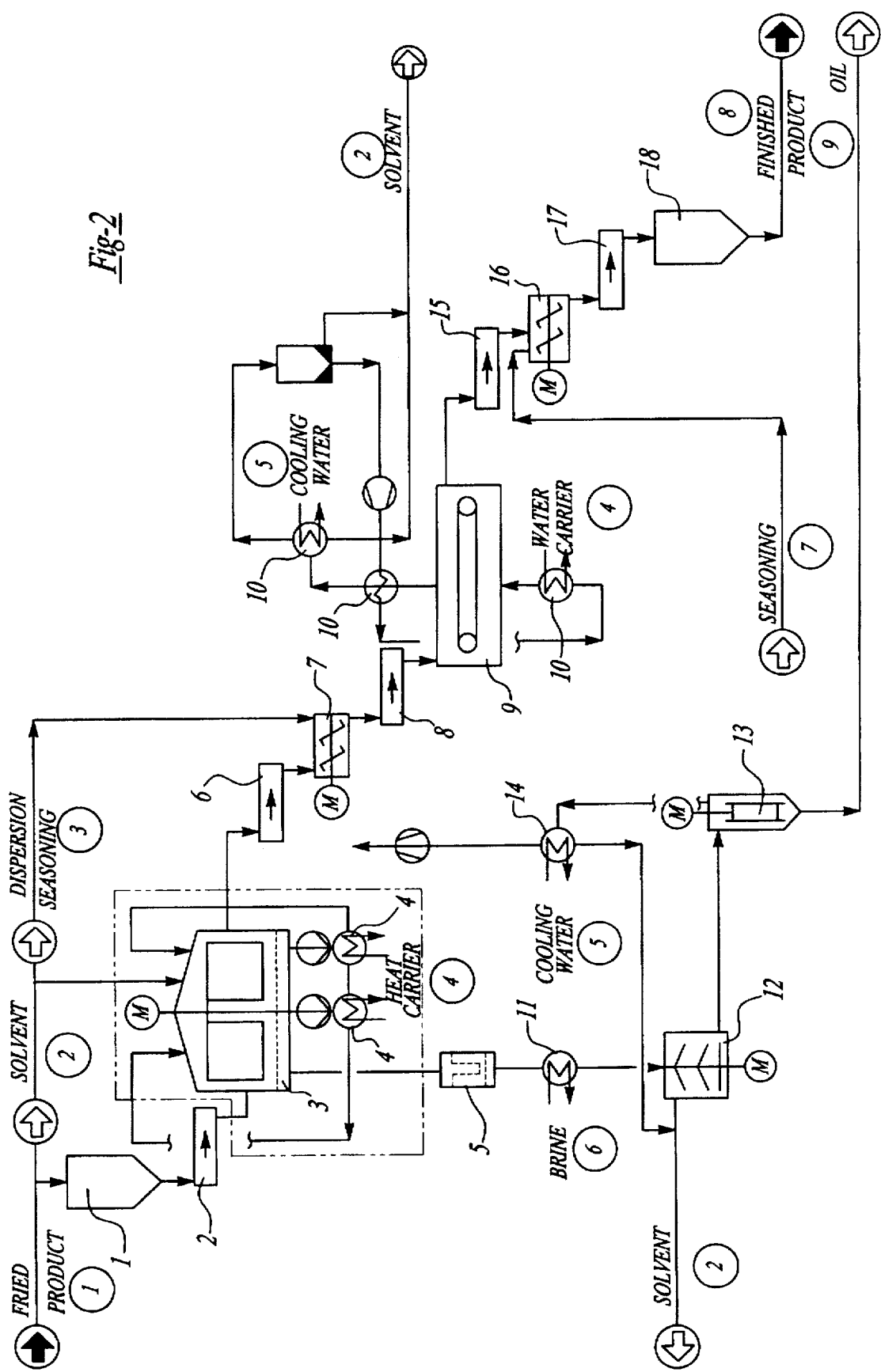
FIG. 2 shows a preferred embodiment of the apparatus which operates with polar solvents.

Below, this invention will be described in greater detail on the basis of the FIGS.

The process, for which the apparatus according to this invention has been specifically designed, comprises the following elements.

2

The fried food products are transported, optionally by way of an intermediate storage area, by means of a conveyer system, which does not subject the products to breakage and which may optionally contain a metering system, into an extractor in which the oil is removed in one or several stages by means of optionally hot organic solvents or miscella with a high solvent content. After the extraction, the oil content is standardized by flooding the food product with a standardized solution, which is followed by or accompanied by dispersion seasoning and optionally seasoning with solids, both of which involve temperature-sensitive flavoring agents or precursors which are transformed into the flavor desired only after exposure to a certain temperature.

After the oil content has been standardized and the chips have been seasoned, they are dried in the course of one or several stages; from the standpoint of safety, it is preferable that inert gas, optionally under a vacuum, be used in the first drying stages. After the food products have been dried, they are generally subjected to seasoning with a liquid and are conveyed to an intermediate storage unit or to a packaging plant.

It is easy to process both the inert gas and the solvent that was used during the extraction for recycling operations. For example, the inert gas can be separated from the solvent by means of a condensation and/or absorption or adsorption process. When polar solvents are used, the miscella that forms during the extraction process can be separated by cooling and subsequent decanting, optionally aided by centrifugation. An additional separation can be obtained by distillation or potentially by rectification. When apolar solvents are used, the miscella is directly subjected to straight-run distillation.

The apparatus according to this invention which is especially suitable for use in the process described above comprises a minimum of one gas-tight extractor 3, a minimum of one gas-tight seasoning unit 7, and a minimum of one gas-tight drying unit 9. The designation M denotes a motor, e.g., for turning a rotary extractor, for operating a mixer, etc. Extractors to be used are those in which the fragile product that is to be extracted is subjected to the least possible, if any mechanical stress and which can be closed so as to have an airtight seal. Such extractors include, for example, belt extractors, perforated drum extractors, vertical basket extractors, and, in particular, rotary extractors. While the rotary extractor and the vertical basket extractor can be operated only intermittently, a continuous operation is possible with the belt extractor and the perforated drum extractor. It is possible to work with one or with several extractors which can be operated in the spray or in the immersion mode, with a minimum of one stage being designed to ensure that the product is completely covered with the solvent ("immersion" of the product in the solvent). This "immersion" stage is preferably the last extraction stage. To include this "immersion stage," the extractor can be designed so that the product to be extracted is introduced and subsequently sprayed until it is completely immersed in the solvent, or the extractor can be filled from below until the product is immersed, or the solvent can be introduced into the immersion stage and the product to be extracted is immersed in it. A minimum of one seasoning unit 7 can optionally be integrated into the extractor. A minimum of one seasoning unit 7 is suitable for dispersion seasoning with temperature-sensitive seasonings or precursors, i.e., with substances which develop their flavors only once subjected to a certain temperature. The seasoning unit can be designed either for spraying or preferably for immersing the food product. In addition, a seasoning stage with solids may be provided but since dispersion seasoning leads to considerably more homogeneous products, dispersion seasoning is to be especially preferred. Hereinafter, the term "seasoning unit 7" will refer especially to dispersion seasoning. A suitable extractor which can optionally be operated with an integrated seasoning unit is a rotary extractor, in which each individual chamber is gas-proofed to prevent an excessively high loss of dispersion seasoning substance. Rotary extractors are generally equipped with 12 segmental chambers. For the extraction of oil in the case at hand, each of these segmental chambers is intermittently filled with the product, from which oil is to be extracted, and charged with an extraction solvent and subsequently emptied. The extraction solvent can be introduced from below or from above. It may circulate in pulsed operation or preferably in continuous operation through the individual chambers. External heat-exchangers 4 keep the extraction solvent at the predetermined optimum operating temperature, especially in a range from 40° C. to 100° C. A rotary extractor should have a minimum of 4 chambers, one that is filled, a second in which the extraction takes place, a third for standardizing the oil content, and a fourth for emptying. It is, however, recommended that two chambers be set aside for the extraction process so that the extraction can be carried out in the preferred manner, i.e., in several stages and with a programmed liquid control. An additional chamber can served as a seasoning unit 7.

In the application according to this invention, the rotary unit of the extractor rotates at a rate of only 0.5–2 revolutions per hour. The material to be extracted is present in the segmented chambers in the form of a solid bed. This ensures that the mechanical stress on the material to be extracted is negligibly low. Downstream, the extractor is attached to a closed metering and transporting unit 6, for example, a metering chute for conveying the extracted product either to at least one gas-tight seasoning unit 7 unless such a seasoning unit has already been integrated into the extractor or if, in addition to dispersion seasoning, seasoning by sprinkling a seasoning mixture is desired, which is again followed by a metering and transporting unit 8 which conveys the product intermittently or continuously to a gas-tight drying unit 9, but drying unit 9 can also be directly connected to extractor 3 by means of a metering and transporting unit 6/8.

In addition to the metering chutes mentioned above, other suitable closed metering and transporting units include, for example, slides, vibrating chutes, and conveyor belts.

As a seasoning unit 7, any seasoning mixer which puts the least possible or preferably no mechanical stress on the product can be used. The apparatus must allow a homogeneous distribution of the dispersion on the solid material. Apparatuses that can be used as seasoning mixers include, for example, batch extractors or drum mixers which can be operated while being flooded or sprayed, with the flooded operation being preferred. It is, of course, apparent to those skilled in the art that the above-mentioned standardization of the oil content can optionally also be carried out simultaneously during dispersion seasoning in seasoning unit 7.

Suitable gas-tight drying units 9 are especially those drying units which can be operated with closed inert-gas recirculation in one or several steps, for example, a belt drying unit, a fluidized-bed drying unit, and a rotary-tube drying unit (that is designed for countercurrent operation). A drying unit to be preferred is a belt drying unit with three sections and separate inert-gas recirculation cycles. External heat exchangers 10 heat the inert gas, which is circulated by means of fans, for each section individually to a predetermined optimum operating temperature. If the heated inert gas by itself is not able to ensure the temperature required, additional heating devices can, of course, be provided on the drying unit 9 as such. The extraction solvent can be recovered from the inert gas either by means of condensation, absorption, or a combination of these processes. Suitable condensing units and adsorption or absorption devices 10 are well known to those skilled in the art and include molecular sieves.

If the extracted product is to be treated with additional, especially with temperature-sensitive flavoring agents, an additional seasoning unit 16, especially an additional seasoning mixer, is attached to the drying unit by way of a metering and transporting unit 15, in which seasoning mixer a final seasoning is added by means of spraying it on according to a well-known method. An immersion is, however, also possible. An additional metering and transporting unit 17, for example, a metering chute, transports the seasoned chips either to an intermediate storage unit 18 or directly to a packaging plant.

Since it is hardly ever possible to carry out the frying and extracting process at the same time, an intermediate storage unit 1 is preferably interconnected between the frying unit and the extractor, which storage unit is connected via a metering and transporting unit 2, especially a metering chute, to the extractor.

The apparatus can be operated both with apolar and with polar solvents, especially with solvents with a boiling point below 100° C. and with a melting point above 15° C. Examples of apolar solvents are alkanes, for example, hexane and petroleum ether, acetone, ether, and liquid esters of low alcohols with short-chain fatty acids. Polar solvents are, for example, low alcohols, especially ethanol. All of these solvents can be recovered in a simple manner from the inert-gas circulation by means of condensation and/or absorption or adsorption.

A solvent recovery unit is preferably connected to extractor 3. Solvent recovery can be carried out by means of distillation or, if polar solvents were used, by separating the solvents by means of a centrifuge.

Downstream of the miscella discharge of the extractor, a filtering unit 5 is preferably provided. A distillation unit 13 with an in-line condenser 14 can be connected directly to miscella discharge or to filtering unit 5, which distillation unit can be operated under pressure and temperature conditions which are best adapted to the extraction solvent used. Due to the considerable difference in the boiling point of oil and extraction solvent, distilling unit 13 can be very simply designed. Distilling units to be preferred are falling-film or thin-film evaporators.

As a preferred alternative, a solvent recovery unit for polar solvents consists of a cooling unit 11 which is directly attached to extractor 3 or filtering unit 5, which cooling unit can be, for example, a heat exchanger designed to be able to cool the solvent, for example, in the case of ethanol, to a temperature below 20° C. Connected to the heat exchanger is a decanting unit 12, preferably a decanting centrifuge or especially a disk centrifuge, to which the above-described distilling unit 13 with an in-line condenser 14 is connected. Due to the fact that the miscella can be readily separated into a phase with a high oil content and into one with a low oil content, distilling unit 13 and the in-line condenser 14 can be designed to have smaller dimensions than would be required for straight-run distillation. Thus, the modification which is particularly suitable for use with polar solvents is considerably more cost-effective as far as operation is concerned.

The above-described separation of the miscella is generally sufficiently satisfactory so that the fraction with a high solvent content can be directly reused as an extraction solvent. But if the solvent or the extracted oil is to be additionally purified, a rectification both for the miscella with a high oil content and the miscella with a high solvent content can be carried out immediately after the above-described separation. For this purpose, any rectification column, especially a column with structured packing, is suitable.

We claim:

1. An apparatus for the continuous extraction of oil from fried food products, sequentially comprising an extractor (3), a basic seasoning unit (7), and a drying unit (9) wherein said fried food products are passed from said extractor to said seasoning unit and subsequently to said drying unit during processing.

2. The apparatus as claimed in claim 1, characterized by the fact that it also comprises a final seasoning unit (16) which follows the drying unit (9).

3. The apparatus as claimed in claim 1, characterized by the fact that the extractor (3) is either a rotary extractor, a belt extractor, a perforated drum extractor, a vertical basket extractor, or a combination of these extractors mentioned.

4. The apparatus as claimed in claim 1, characterized by the fact that the drying unit (7) is either a belt drying unit, a fluidized-bed drying unit, a perforated drum drying unit, or a combination of these drying units mentioned.

5. The apparatus as claimed in claim 1, characterized by the fact that the seasoning unit (7, 16) is an apparatus with a spraying device and/or with an immersion device, which at the same time ensures a homogeneous distribution.

6. The apparatus as claimed in claim 1, characterized by the fact that each seasoning unit (7, 16) is independently chosen from the group of batch extractors and drum mixers.

7. The apparatus as claimed in claim 1, characterized by the fact that for the transport of the fried food product between the components of the apparatus, there are closed conveyor elements, each of which is independently chosen from the group of sliders, vibrating chutes, conveyor belts, or a combination of these.

8. The apparatus as claimed in claim 1, characterized by the fact that miscella is fed to a cooling unit (11) and subsequently to a mechanical separating stage (12), especially to a decanting centrifuge or a disk centrifuge.

9. The apparatus as claimed in claim 1, characterized by the fact that to separate the miscella, it is fed directly, or after having passed through a centrifuge, to a distilling apparatus (13), especially a falling-film or thin-film evaporator, with an in-line condenser (14).

10. Use of an apparatus as claimed in claim 1 for the extraction of oil from fried food products by means of a polar solvent and subsequent standardization of the oil content, dispersion seasoning, and drying of the food products.

11. The use of an apparatus as claimed in claim 1 for the extraction of oil from fried food products by means of an apolar solvent and subsequent standardization of the oil content, dispersion seasoning, and drying of the food products.

* * * * *